(12) United States Patent
Sahoo et al.

(10) Patent No.: US 8,688,552 B1
(45) Date of Patent: Apr. 1, 2014

(54) PERFORMING SEPARATE ACCOUNTING AND BILLING FOR EACH CUSTOMER OF A SHARED CUSTOMER DEVICE

(75) Inventors: Debi Prasad Sahoo, San Jose, CA (US); Chakradhar Kar, Sunnyvale, CA (US); Moojin Jeong, San Jose, CA (US); Rajagopalan Subbiah, San Jose, CA (US); Prakash Kamath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

(21) Appl. No.: 13/161,982

(22) Filed: Jun. 16, 2011

Related U.S. Application Data (60) Provisional application No. 61/489,921, filed on May 25, 2011.

(51) Int. Cl.
*G07F 19/00* (2006.01)
*G06F 15/173* (2006.01)
*H04M 11/00* (2006.01)
*G06Q 30/04* (2012.01)
*H04L 12/24* (2006.01)
*H04W 4/24* (2009.01)

(52) U.S. Cl.
CPC ............ *G06Q 30/04* (2013.01); *H04L 41/0213* (2013.01); *H04W 4/24* (2013.01); *H04M 2215/32* (2013.01)

USPC ............ 705/34; 709/223; 455/408; 455/406; 455/405

(58) Field of Classification Search
None
See application file for complete search history.

(56) References Cited

U.S. PATENT DOCUMENTS

2003/0041135 A1 * 2/2003 Keyes et al. .................. 709/223

* cited by examiner

*Primary Examiner* — Ryan Zeender
*Assistant Examiner* — Denisse Ortiz Roman
(74) *Attorney, Agent, or Firm* — Shumaker & Sieffert, P.A.

(57) ABSTRACT

Techniques are described that facilitate performing accounting and billing separately for each customer of a service provider account registered to an owner of a shared customer device. An access router performs separate data usage accounting for each of the customers in sub-accounts of the registered service provider account based on customer virtual local area network (CVLAN) and service VLAN (SVLAN) tags included in data packets. A network operator may, therefore, generate a bill for the shared customer device that includes separate data usage charges for each customer. To facilitate the techniques, the access router may determine a CVLAN and SVLAN associated with a customer. The CVLAN and SVLAN tags are included in a service request toward a service provider, and copied into a service request reply toward the shared customer device. The shared customer device then includes the tags in data packets to identify the customer to the access router.

50 Claims, 5 Drawing Sheets

PERFORMING SEPARATE ACCOUNTING AND BILLING FOR EACH CUSTOMER OF A SHARED CUSTOMER DEVICE

PRIORITY CLAIM

This application claims the benefit of U.S. Provisional Application No. 61/489,921, filed May 25, 2011, the entire content of which is incorporated herein by reference.

TECHNICAL FIELD

The invention relates to computer networks and, more specifically, to layer two (L2) computer networks.

BACKGROUND

A computer network is a collection of interconnected computing devices that exchange data and share resources. Networks that primarily utilize data link layer devices are often referred to as layer two (L2) networks. In a L2 network, e.g., an Ethernet network, customer devices, including servers, printers, computers, and the like, are connected by one or more data link layer devices referred to as access nodes. The access nodes, such as digital subscriber line access multiplexers (DSLAMs) or cable modem termination systems (CMTS), forward L2 packets to devices within the network.

Recently, network service providers have offered systems that provide L2 connectivity between multiple, geographically separate L2 customer networks. One mechanism by which network service providers provide L2 connectivity to their customers is by utilization of Virtual Local Area Networks (VLANs). A service provider may associate different VLANs with different customers so that L2 packets and control information for the networks are logically separate for the customers. Each VLAN provides a connection between devices assigned to the VLAN, and each of the VLANs may essentially be treated as an independent layer two (L2) network. A device assigned to one VLAN can communicate with other devices on that VLAN but may be unable to communicate with devices on a separate VLAN. L2 packets for different VLANs may be correctly forwarded within a network by appending VLAN tags to the packets to designate the VLAN to which each packet belongs.

In L2 wholesale computer networks, the network service provider contracts with a network operator to utilize existing infrastructure, such as copper telephone lines, to deliver data or Internet services to the customers of the network operator. Often, the service provider in this arrangement is referred to as an Internet service provider (ISP). Using the existing network infrastructure owned and operated by the network operator, the ISP provides data or Internet services to which one or more customers of the network operator may subscribe. In this arrangement, the network operator may contract with a number of different ISPs to provide customers of the network operator with a choice of services at competitive prices. This network operator is considered a L2 wholesaler in that the network operator offers L2 connectivity for use by any ISP.

SUMMARY

In general, techniques are described that facilitate performing accounting and billing separately for each customer or subscriber of a service provider account registered to an owner of a shared customer device. The techniques enable the owner of the shared customer device to operate as a virtual retail service provider and equitably share the cost of its registered service provider account with multiple, unregistered customers in the same residential or business complex. In this way, a network operator may generate a bill for the owner of the shared customer device that includes separate data usage charges for each customer of the service provider account registered to the owner of the shared customer device based on the data usage accounting performed by the access router.

More specifically, according to the techniques, an access router of the network performs separate data usage accounting for each of the customers in sub-accounts of the service provider account registered to the shared customer device based on customer virtual local area network (CVLAN) and service VLAN (SVLAN) tags included in received data packets. The access router, therefore, may update data usage for each customer of the registered service provider account, identified by the CVLAN tag, and for each type of service and service provider requested by that customer, identified by the SVLAN tag. This may be especially useful in a wholesale layer 2 (L2) network in which each type of service may be provided by a different service provider and at a different price.

In order to facilitate the separate accounting and billing, in response to receiving a service request, e.g., a Dynamic Host Configuration Protocol (DHCP) request, for one of the customers from the shared customer device, the access router may determine the CVLAN and SVLAN associated with the customer and generate a sub-account entry of the registered service provider account linked to the CVLAN and SVLAN for the customer. The access router also includes the CVLAN and SVLAN tags in the service request forwarded toward a service provider server, e.g., a DHCP server. The service provider server copies the CVLAN and SVLAN tags into a service request reply, e.g., DHCP reply, for the customer forwarded toward the shared customer device. The shared customer device may then include the CVLAN and SVLAN tags associated with the customer in data packets to identify the customer to the access router.

In one example, the disclosure is directed toward a method comprising receiving data packets including tags identifying CVLANs and SVLANs associated with a plurality of customers of a service provider account registered to a shared customer device, and performing data usage accounting separately for each of the plurality of customers in sub-accounts of the service provider account registered to the shared customer device based on the tags.

In another example, the disclosure is directed toward an access router comprising a plurality of interfaces, wherein at least one of the plurality of interfaces is configured to receive data packets including tags identifying CVLANs and SVLANs associated with a plurality of customers of a service provider account registered to a shared customer device, and a control unit configured to perform data usage accounting separately for each of the plurality of customers in sub-accounts of the service provider account registered to the shared network device based on the tags.

In a further example, the disclosure is directed to a non-transitory computer-readable storage medium comprising instruction that cause one or more processors to receive data packets including tags identifying CVLANs and SVLANs associated with a plurality of customers of a service provider account registered to a shared customer device, and perform data usage accounting separately for each of the plurality of customers in sub-accounts of the service provider account registered to the shared network device based on the tags.

In another example, the disclosure is directed to a system comprising a shared customer device that maintains at least one registered service provider account shared by a plurality of customers connected to the shared customer device, wherein the shared customer device is configured to add tags identifying CVLANs and SVLANs to data packets generated by the plurality of customers, and an access router configured to perform data usage accounting separately for each of the plurality of customers in sub-accounts of the service provider account registered to the shared customer device based on the CVLAN tags and the SVLAN tags included in received data packets.

In a further example, the disclosure is directed toward a method comprising maintaining at least one service provider account registered to a shared customer device, wherein the registered service provider account is shared by a plurality of customers connected to the shared customer device. The method also includes adding, with the shared customer device, tags identifying CVLANs and SVLANs to data packets generated by the plurality of customers, and performing, with an access router, data usage accounting separately for each of the plurality of customers in sub-accounts of the service provider account registered to the shared customer device based on the CVLAN tags and the SVLAN tags included in received data packets.

In another example, the disclosure is directed to a non-transitory computer-readable storage medium comprising instruction that cause one or more processors to maintain at least one service provider account registered to a shared customer device, wherein the registered service provider account is shared by a plurality of customers connected to the shared customer device, add tags identifying CVLANs and SVLANs to data packets generated by the plurality of customers at the shared customer device, and perform data usage accounting separately for each of the plurality of customers in sub-accounts of the service provider account registered to the shared customer device based on the CVLAN tags and the SVLAN tags included in received data packets at an access router.

The details of one or more embodiments of the techniques described in this disclosure are set forth in the accompanying drawings and the description below. Other features, objects, and advantages of these techniques will be apparent from the description and drawings, and from the claims.

DETAILED DESCRIPTION

Figure 1:
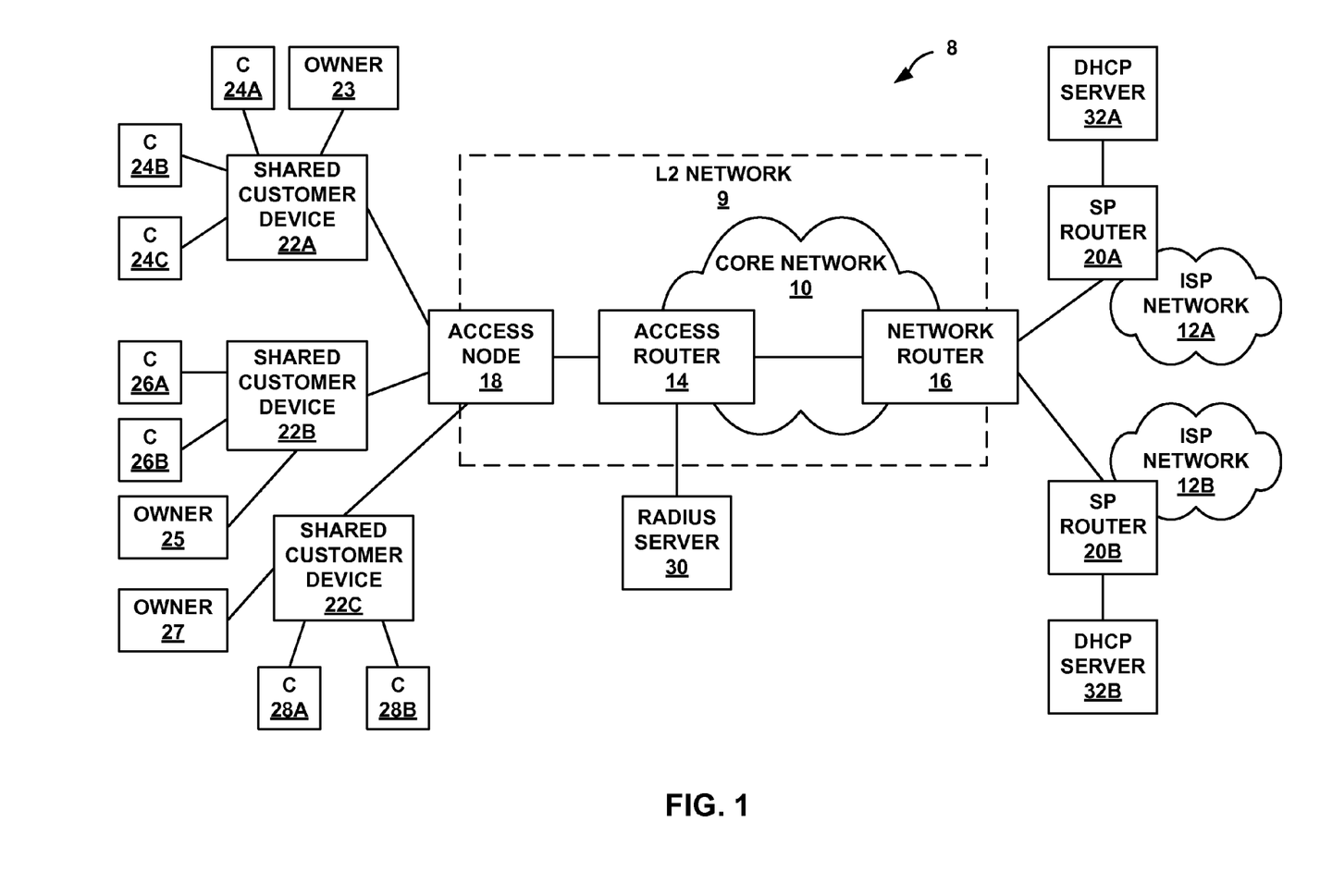
FIG. 1 is a block diagram illustrating an example of a network system that implements techniques for performing accounting and billing separately for each customer of a service provider account registered to an owner of a shared customer device.

FIG. 1 is a block diagram illustrating an example of a network system 8 that implements techniques for performing accounting and billing separately for each customer of a service provider account registered to an owner of a shared customer device. In the example of FIG. 1, network system 8 includes a layer 2 (L2) network 9, such as an Ethernet network, and a plurality of Internet service provider (ISP) networks 12A and 12B ("ISP networks 12") that provide services to customers of the L2 network. In some examples, L2 network 9 may comprise a wholesale L2 network. In that case, each of ISP networks 12 may contract with a network operator to use the existing infrastructure of L2 network 9 to provide services to one or more customers of L2 network 9. In the illustrated example, the network operator may contract with ISP network 12A and ISP network 12B to provide customers of L2 network 9 with a choice of services at competitive prices. In this case, the network operator may be considered a L2 wholesaler in that the network operator offers L2 connectivity for use by any of ISP networks 12.

In the illustrated example, L2 network 9 includes an access node 18 and a core network 10 with an access router 14 and a network router 16. Core network 10 generally represents a multiprotocol label switching (MPLS) network that implements one or more of a suite of MPLS protocols, such as a Resource Reservation Protocol (RSVP) and a Label Distribution Protocol (LDP). Core network 10 may implement one of the MPLS protocols to provision label switched paths (LSPs). Often, core network 10 is a layer three (L3) network that implements a L3 protocol, such as an Internet Protocol (IP). In this L3 network, the LSPs represent L2 paths or tunnels through the L3 network represented by core network 10.

L2 network 9 may be configured to operate as an Ethernet network to provide L2 connectivity between various customers and ISP networks 12. One mechanism by which L2 network 9 may provide L2 connectivity to its customers is with Virtual Local Area Networks (VLANs). L2 network 9 may be logically separated into customer VLANs (CVLANs) that deliver multiple services to a single customer and/or service VLANs (SVLANs) that deliver a single service to all customers. Each VLAN provides a connection between devices assigned to the VLAN, and each of the VLANs may essentially be treated as an independent L2 network.

ISP networks 12 may assign a different customer VLAN (CVLAN) to each of shared customer devices 22A-22C ("shared customer devices 22"). Shared customer devices 22 represent devices, such as customer gateway routers, owned and operated by different customers of L2 network 9. Each of shared customer devices 22 has a registered service provider account with a network operator of L2 network 9 to receive services from at least one of ISP networks 12. In the illustrated example, each of shared customer devices 22 is connected multiple unregistered customers within the same residential or business complex, such as an apartment building, townhome or condominium community, office park, shopping malls, and the like. The unregistered customers may share the service provider account registered to an owner of the shared customer device. For example, shared customer device 22A has an owner 23 to which the service provider account is registered, and customers (C) 24A, 24B and 24 C ("customers 24") that share the registered account. Similarly, shared customer device 22B has an owner 25 to which the service provider account is registered, and customers 26A and 26B ("customers 26") that share the registered account. Shared customer device 22C has an owner 27 to which the service provider account is registered, and customers 28A and 28B ("customers 28").

Each of owners 23, 25 and 27 of shared customer devices 22 may, for example, comprise a landlord or building manager of the residential or building complex in which their respective customers reside. In some cases, owners 23, 25 and 27 may also comprise tenants within the residential or building complex. As an example, in the case of shared customer device 22A, owner 23 may maintain a registered service provider account with the network operator of L2 network 9 for services from at least one of ISPs 12, and customers 24 may comprise tenants within the residential or business complex managed by owner 24. According to the techniques, customers 24 may share the service provider account registered to owner 23 of shared customer device 22A in order to access L2 network 9.

Customers 24, 26 and 28 are customers or subscribers of the registered service provider accounts maintained by shared customer devices 22, but are not customers or subscribers of L2 network 9 or ISP networks 12. Customers 24, 26 and 28 are, instead, unregistered customers or subscribers that may only gain access to L2 network 9 via one of the service provider accounts registered to the owners of shared customer devices 22. Each of customers 24, 26 and 28 may use one or more of a desktop computer, a laptop computer, a workstation, a computing device referred to as a "netbook," a cellular phone (including so-called "smart phones"), a server, a set-top box (STB), an Internet enabled television, a VoIP phone, or any other device capable of accessing L2 network 9 via the registered account of the respective one of shared customer devices 22. In some examples, one or more of the customers 24, 26 and 28 may be connected to the respective one of shared customer devices 22 via a remote connection. For example, customer 24A may be able to log into shared customer device 22A while traveling, for example, to use the service provider account registered to owner 23 of shared customer device 22A instead of paying for a separate connection at the remote location.

According to the techniques, ISP networks 12 may designate pools of CVLANs associated with each of shared customer devices 22 for access router 14 to assign to each of the unregistered customers 24, 26 and 28 connected to shared customer devices 22. For example, ISP network 12A may designate a pool of CVLANs associated with shared customer device 22A, and access router 14 may, in turn, assign a CVLAN from the pool to customer 24A of the service provider account registered to owner 23 of shared customer device 22A. In this way, access router 14 may act as a Dynamic Host Configuration Protocol (DHCP) server proxy for the unregistered customers 24, 26 and 28 of the registered service provider accounts of shared customer devices 22. By assigning each of the customers a different CVLAN, access router 14 may uniquely identify and distinguish between the different customers of the same registered account and perform data usage accounting and billing separately for each of the customers in sub-accounts of the service provider accounts registered shared customer devices 22. Multiple CVLANs may be associated with the same customer depending on the number of ISP networks 12 with which the shared customer device maintains registered accounts.

Also according to the techniques, access router 14 may assign a different SVLAN to each type of service provided by each of ISP networks 12. For example, a different SVLAN may be assigned to each of voice service, data service, and television service provided by ISP network 12A, and voice service, data service, and television service provided by ISP network 12B. By assigning a different SVLAN for each type of service from each of ISP networks 12, access router 14 may uniquely identify and distinguish between the different types of service and service providers. Access router 14 may then perform data usage accounting and billing separately for each type of service and service provider for which shared customer devices 22 are registered. In some cases, multiple SVLANs may be associated with the same CVLAN assigned to one of the customers 24, 26 and 28 depending on the number of services requested by that customer from the same service provider. In other cases, multiple SVLANs may be associated with multiple different CVLANs assigned to one of the customers 24, 26 and 28 depending on the number of services requested by that customer from different service providers.

Access router 14 represents a network device that may implement L2 switching functionality as well as the one or more MPLS protocols noted above and L3 network protocols, such as IP. Access router 14 provides access for a plurality of customers connected to access node 18 to core network 10. While only one access node 18 is shown in the example of FIG. 1, access router 14 may couple to a plurality of access nodes similar to access node 18 and aggregate L2 customer traffic forwarded by the plurality of access nodes for delivery into core network 10.

As shown in the example of FIG. 1, access router 14 may couple to a Remote Access Dial-In User Service (RADIUS) server 30 that implements a RADIUS protocol for performing authentication, authorization and accounting. Access router 14 interfaces with RADIUS server 30 to determine whether shared customer devices 22 are authorized to access core network 10. For example, access router 14 may provide authentication information provided in a service request, such as a DHCP request, for one of customers 24 of the service provider account registered to owner 23 of shared customer device 22A. According to the techniques of this disclosure, RADIUS server 30 may also store data defining certain provisioning information for VLANs, such as CVLANs assigned to shared customer devices 22 and customers 24, 26 and 28, and SVLANs assigned to different types of services provided by ISP networks 12. Moreover, RADIUS server 30 may store an accounting database in which access router 14 stores data usage information for each service provider account registered to shared customer devices 22 and, under each registered service provider account, separately stores data usage information in sub-accounts for each customer of the registered service provider account.

Network router 16 provides an egress from core network 10 and represents a network-to-network interface (NNI) provider edge (PE) router that provides an interface between core network 10 and ISP networks 12. Throughout core network 10, one or more pseudowires (PWs) may be defined to connect access router 14 and network router 16. Generally, a PW represents a bidirectional path that emulates a service not natively supported by the underlying network. For example, assuming core network 10 represents a L3 network, a PW may be provisioned to emulate certain types of L2 connectivity (e.g., L2 Ethernet connectivity) despite that this L3 network may not natively support this form of L2 connectivity. A first PW between access router 14 and network router 16 may correspond to ISP network 12A, and a second PW between access router 14 and network router 16 may correspond to ISP network 12B.

L2 network 9 switches L2 packets, such as Ethernet frames, rather than routes packets as is the case in L3 networks. Each device of L2 network 9 that implements L2 switching, including access node 18, access router 14, and network router 16, discover or otherwise learn how to switch these L2 packets during the normal course of receiving and switching traffic. In the case where L2 network 9 comprises a L2 wholesale network, the learning occurs with respect to a given VLAN. For example, when shared customer device 22A is associated with a given CVLAN and/or SVLAN, access router 14 learns only within the context of the CVLAN and/or SVLAN and stores data defining a separate L2 learning table solely for use in learning the location of customer devices also associated with the given CVLAN and/or SVLAN.

ISP networks 12 each represents a network owned and operated by a different ISP. Typically, ISP networks 12 each represent L3 networks that implement a L3 protocol, such as the above noted IP, to forward data units referred to as packets from source devices to destination devices. ISP networks 12 may each form a part of a public network, such as the Internet, that is publically accessible. Each of ISPs 12 includes service provider (SP) routers 20A and 20B ("SP routers 20"), respectively. Each of SP routers 20 represents a L3 network device that implements a L3 protocol, such as IP, to route the above mentioned packets throughout their respective ISP networks 12. ISP networks 12 may provide one of more types of service to requesting customers. More specifically, ISP networks 12 may provide voice service, e.g., voice over IP (VoIP), data service, e.g., Internet access, and television service, e.g., IP television (IPTV).

In the illustrated example, SP router 12A is connected to a Dynamic Host Configuration Protocol (DHCP) sever 32A and SP router 12B is connected to a DHCP server 32B. DHCP servers 32A and 32B ("DHCP servers 32") comprise service provider servers that provide configuration information that includes network addresses, such as IP addresses, and CVLANs, to customers in response to requests for service, i.e., DHCP requests, from ISP networks 12. Each of DHCP servers 32 maintains an IP address space for the respective ISP networks 12 from which to assign IP addresses to requesting customers. In addition, each of DHCP servers 32 may maintain a pool of CVLANs from which to assign CVLANs to requesting customers.

As further shown in the example of FIG. 1, network system 8 also includes at least one access node in the form of access node 18 and shared customer devices 22 coupled to access node 18. Access node 18 represents a network device, such as a digital subscriber line access modem (DSLAM) or a cable modem termination system (CMTS), configured to aggregate network traffic originated by shared customer devices 22 for delivery upstream to access router 14. Access node 18 generally implements L2 switching functionality to facilitate the delivery of traffic to and from shared customer devices 22.

Conventionally, access router 14 only performs accounting and billing on a per registered service provider account basis. While this model may work well for single family residences, in the case of residential and business complexes it may be more scalable and economical to enable the registered service provider accounts to be shared between multiple customers within the same complex. Under the current system, the owner of a shared customer device is responsible for the entire cost of data usage by all unregistered customers of the service provider account registered to the owner. The owner may divide the total bill equally among the unregistered customers, but has no ability to determine how much data or bandwidth was actually used by each of the customers in order to equitably divide the bill.

According to the techniques described in this disclosure, access router 14 is configured to perform data usage accounting and billing separately for each of the customers 24, 26 and 28 of service provider accounts registered to respective owners 23, 25 and 27 of shared customer devices 22. In order to facilitate the separate accounting and billing techniques, for example, access router 14 determines CVLANs and SVLANs as identifiers for each of customers 24 of the service provider account registered to owner 23 of shared customer device 22A and each type of service and service provider requested by that customer during control plane configuration. More specifically, in response to receiving a service request, i.e., a DHCP request, for one of customers 24 from shared customer device 22A, access router 14 determines the CVLAN and SVLAN associated with the customer from a pool associated with the registered account of shared customer device 22A stored in RADIUS server 30. Access router 14 may also generate a sub-account entry of the registered service provider account linked to the CVLAN and SVLAN for the one of customers 24. The sub-account entry may be included under the registered service provider account of shared customer device 22 in the accounting database stored in RADIUS server 30.

Access router 14 includes the CVLAN and SVLAN tags in the service request forwarded toward the one of ISP networks identified by the SVLAN tag, e.g., ISP network 12A. DHCP server 32A associated with ISP network 12A then copies the CVLAN and SVLAN tags into a service request reply, i.e., DHCP reply, for the one of customers 24 forwarded toward shared customer device 22A. The DHCP reply includes an IP address assigned to the one of customers 24 by DHCP server 32A, the CVLAN assigned to the one of customers 24 by access router 14 from the pool designated by ISP network 12A, and the SVLAN assigned to the service requested by the one of customers 24 by access router 14. Shared customer device 22A may then link the CVLAN and SVLAN tags associated with the one of customers 24 to the IP address assigned to the one of customers 24. When shared customer device 22A receives a data packet from the one of customers 24, shared customer device 22A may include the CVLAN and SVLAN tags associated with that customer in the data packet to identify the customer to access router 14.

Access router 14 performs separate data usage accounting for each of the customers 24, 26 and 28 in sub-accounts of the service provider accounts registered to respective owners 23, 25 and 27 of shared customer devices 22 based on the CVLAN and SVLAN tags included in received data packets. Access router 14 updates the sub-account entry linked to the CVLAN and SVLAN associated with the customer stored in RADIUS server 30 based on the size of the received packet. In this way, access router 14 may update data usage for each customer, identified by the CVLAN tag, and for each type of service and service provider requested by that customer, identified by the SVLAN tag. Access router 14 may then calculate the aggregate data usage for each customer based on the data usage for one or more types of services requested by the customer and identified by different SVLANs.

Periodically, e.g., near the end of a billing cycle, access router 14 may report the data usage for the customers 24, 26 and 28 of the service provider accounts registered to shared customer devices 22 to the network operator to generate bills for shared customer devices 22. In addition, shared customer devices 22 may access their service provider accounts with the network operator to report the number of unregistered customers connected to the shared customer devices 22, the IP addresses assigned to the customers, and the CVLAN and SVLAN tags linked to the IP addresses. For example, shared customer device 22A may report to the network operator that it has three unregistered customers 24. In addition, for a given customer 24A, shared customer device 22A reports the IP addresses assigned to customer 24A and the CVLAN and SVLAN tags linked to the IP addresses. In this way, the network operator may determine which CVLAN and SVLAN tags are associated with which customers 24, 26 and 28.

The techniques enable access router 14 to report separate data usage charges for each of the customers 24, 26 and 28 of the registered service provider accounts of shared customer devices 22. The network operator may generate bills for the owners of each of shared customer devices 22 that are broken down according to each of the customers 24, 26 and 28 of shared customer devices 22 based on the usage information received from access router 14 and the customer linking information received from shared customer devices 22. For example, owner 23 of shared customer device 22A receives a bill from the network operator that includes separate data usage charges for each of unregistered customers 24. Owner 23 may then, in turn, bill each of customers 24 for the actual amount of bandwidth or data used by that customer during the billing cycle. In this way, the techniques enable shared customer device 22A to operate as a virtual retail service provider and share the cost of its registered service provider account with unregistered customers 24 in the same residential or business complex.

Figure 2:
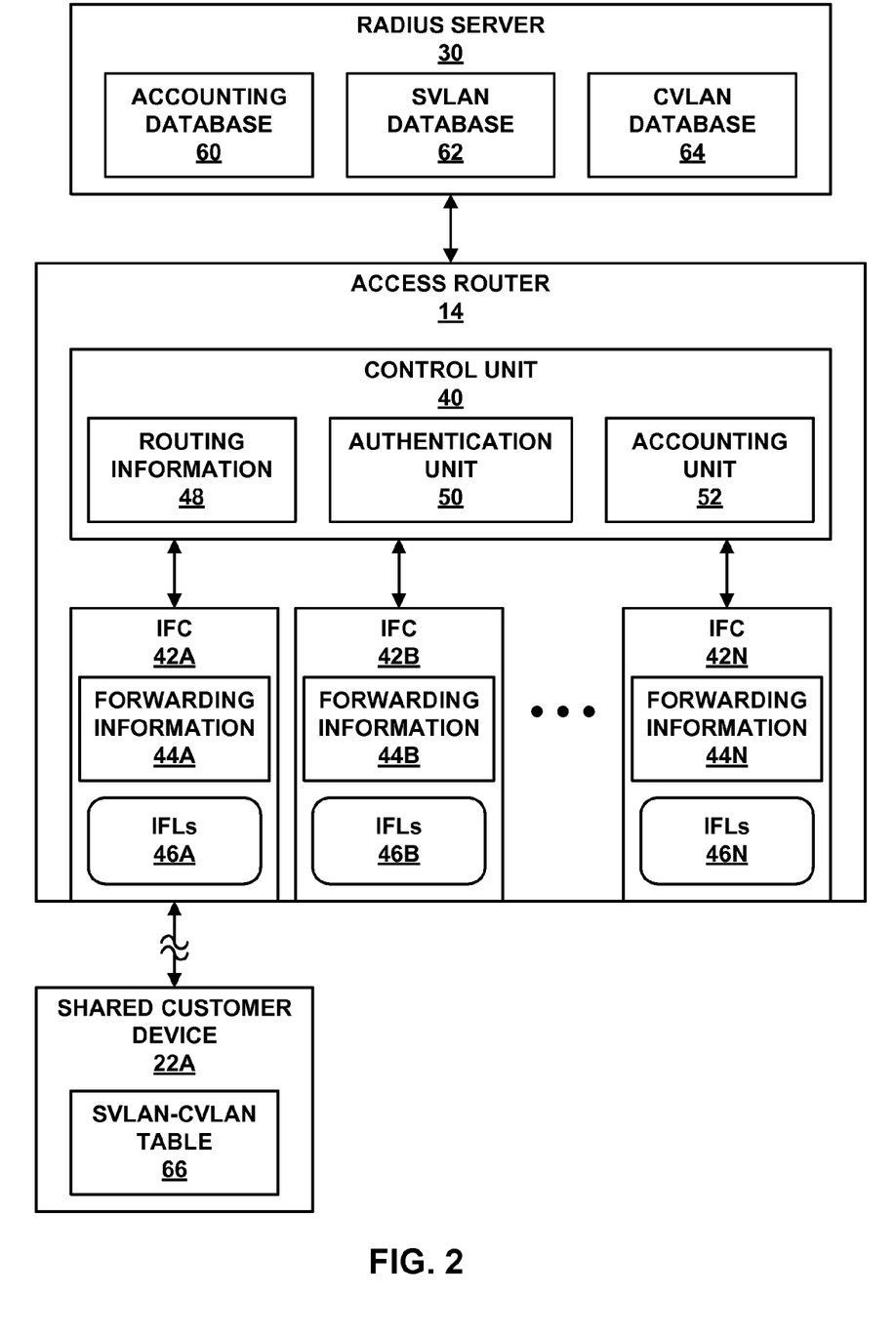
FIG. 2 is a block diagram illustrating an access router configured to perform accounting and billing separately for each customer of a service provider account registered to an owner of a shared customer device.

FIG. 2 is a block diagram illustrating access router 14 configured to perform accounting and billing separately for each of customers 24 of a service provider account registered to owner 23 of shared customer device 22A. In the example of FIG. 2, access router 14 is illustrated in connection with shared customer device 22A and RADIUS server 30. In other examples, access router 14 may be connected to one or more of shared customer devices 22 via access node 18, and network router 16.

In the example of FIG. 2, access router 14 includes a control unit 40 that performs control and management of the operations of access router 14, including those operations directed to maintaining a state or topology of core network 10, such as executing routing protocols and maintaining routing information 48. Control unit 40 also includes authentication unit 50 and accounting unit 52 to perform authentication and accounting operations for each of the customers with respect to RADIUS server 30.

Control unit 40 may comprise one or more processors (not shown in FIG. 2) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively, control unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Access router 14 also includes interface cards 42A-42N ("IFCs 42"). IFCs 42 may each represent a distributed forwarding engine of access router 14 dedicated to the movement of data, either by way of L3 forwarding or L2 switching. For example, each of IFCs 42 may be configured to switch L2 packets by control unit 40, which may in this instance represent a routing engine. IFCs 42 generally provide logic necessary to perform data plane operations and may support these operations with buffers and other hardware units, such as micro-controllers. In some instances, IFCs 42 are implemented in the context of a FPGA, ASIC and/or any other form of dedicated hardware for performing the data plane operations.

IFCs 42 store forwarding information 44A-44N ("forwarding information 44"), which includes data used to switch or otherwise forward packets. In the case of an L2 network, such as L2 network 9 from FIG. 1, forwarding information 44 may include data defining L2 learning tables. Generally, IFCs 42 communicate with one another to maintain routing information 44 in a synchronous state. That is, updates by one of IFCs 42 to its forwarding information 44 are communicated to the remaining ones of IFCs 42 to perform substantially similar updates to their respective forwarding information 44.

IFCs 42 also comprise logical interfaces 46A-46N ("IFLs 46"). Each of IFLs 46 is configured on a physical port or interface to a communication medium, such as a link. Each of IFLs 46 includes all addressing, protocol information, and other properties that allow the physical port to function. Each of IFCs 42 may include any number of physical ports, and each port may include any number of logical interfaces. According to the techniques, access router 14 may configure one of IFLs 46 toward shared customer device 22A for each CVLAN and SVLAN pair associated with customers 24 of the service provider account registered to shared customer device 22A.

In the example of FIG. 2, access router 14 is connected to RADIUS server 30 that implements a RADIUS protocol for performing authentication, authorization and accounting for customers 24 of the service provider account registered to shared customer device 22A. RADIUS server 30 includes an accounting database 60, a SVLAN database 62, and a CVLAN database 64.

CVLAN database 64 may include a pool of designated CVLANs for unregistered customers 24 of the registered service provider account of shared customer device 22A. As described above with respect to FIG. 1, ISP networks 12 may pre-assign different CVLANs to each of shared customer devices 22, and may also designate pools of CVLANs associated with shared customer devices 22 for access router 14 to assign to each of the customers 24, 26 and 28 connected to shared customer devices 22. For example, ISP networks 12 may pre-assign CVLAN 1 to shared customer device 22A and its owner 23. ISP networks 12 may then designate a pool of CVLANs, e.g., CVLANs 2-10, associated with CVLAN 1, and access router 14 may pre-assign CVLAN 5 to customer 24A, CVLAN 8 to customer 24B, and CVLAN 10 to customer 24C. CVLAN database 64 may then maintain entries that link the CVLANs to the IP addresses assigned to shared customer devices 22 and the respective customers.

SVLAN database 62 may include a pool of SVLANs for each of ISP networks 12 from which access router 14 may assign SVLANs to the different types of services provided by the ISP network. A network operator of L2 network 9 may contract with ISP networks 12 to provide customers with a choice of services at competitive prices. In this way, the network operator is considered a L2 wholesaler in that the network operator offers L2 connectivity for use by any of ISP networks 12.

Shared customer device 22A may choose one or more of ISP networks 12 to provide services to customers 24 of the service provider account registered to shared customer device 22A. For example, shared customer device 22A may choose to receive voice service and television service from ISP network 12A, and may choose to receive data service from ISP network 12B. In other example, shared customer device 22A may choose a different ISP network for each type of service, or may choose a single ISP network to provide all services. SVLAN database 62 may also maintain entries that link the assigned SVLANs to the type of service and service provider selected by each of shared customer devices 22. Table 1, below, provides example entries of SVLAN database 62 for shared customer device 22A.

TABLE 1

| Type of Service | ISP Network 1 | ISP Network 2 |
|---|---|---|
| Voice | SVLAN 10 | |
| Data | | SVLAN 20 |
| TV | SVLAN 30 | |

According to the techniques, accounting database 60 may include one or more accounting entries for service provider accounts registered to each of shared customer devices 22 and, under each registered service provider account, one or more sub-account entries for each of unregistered customers 24 connected to shared customer device 22A. Each sub-account entry is linked to a CVLAN and SVLAN associated with the one of customers 24. For example, a customer may request several different types of service that are each assigned a different SVLAN. In some cases, the customer may be associated with one CVLAN and multiple different SVLANs if the customer requests different types of service from the same service provider. In other cases, the customer may be associated with multiple different CVLAN-SVLAN pairs if the customer requests services from different service providers. In any case, the data usage by the customer for each type of service may be recorded in a separate sub-account entry of the registered service provider account of shared customer device 22A in accounting database 60. This may be especially useful in a wholesale L2 network in which each type of service may be provided by a different service provider and at a different price.

Table 2, below, provides an example of aggregate data usage entries for each owner of shared customer devices 22 and each of unregistered customers 24, 26 and 28 of shared customer devices 22 from FIG. 1. Table 2 provides an example in which all the services are be provided to the customers at the same price, p, per gigabyte (GB).

TABLE 2

| CVLAN of Owner | CVLAN of Customer | Downstream Data usage (GB) | Upstream Data Usage (GB) | Total Usage per Customer (GB) | Cost per Customer | Total Cost per Owner |
|---|---|---|---|---|---|---|
| 1 | 1 | 100 | 200 | 300 | 300 * p | 585 * p |
| | 5 | 100 | 50 | 150 | 150 * p | |
| | 8 | 50 | 25 | 75 | 75 * p | |
| | 10 | 40 | 20 | 60 | 60 * p | |
| 20 | 21 | 30 | 10 | 40 | 40 * p | 100 * p |
| | 25 | 40 | 20 | 60 | 60 * p | |
| 30 | 32 | 20 | 10 | 30 | 40 * p | 160 * p |
| | 38 | 80 | 20 | 100 | 120 * p | |

As shown in Table 2, each of the customers of the service provider account registered to shared customer devices 22 are assigned a different CVLAN. For example, owner 23 of shared customer device 22A may be assigned CVLAN 1, customer 24A may be assigned CVLAN 5, customer 24B may be assigned CVLAN 8, and customer 24C may be assigned CVLAN 10. Similarly, owner 25 of shared customer device 22B may be assigned CVLAN 20, customer 26A may be assigned CVLAN 21 and customer 26B may be assigned CVLAN 25. Finally, owner 27 of shared customer device 22C may be assigned CVLAN 30, customer 28A may be assigned CVLAN 32 and customer 28B may be assigned CVLAN 38.

The techniques described herein enable access router 14 to update the downstream and upstream data usage amounts for each of the unregistered customers based on a size of the packet received with the CVLAN and SVLAN tags associated with the unregistered customer. Access router 14 may also calculate the total data usage per customer, the total cost per customer, and the total cost per owner of the shared customer devices 22. In the illustrated example, the data usage updates and calculations are performed in accounting database 60 stored in RADIUS server 30. In other examples, accounting database 60 may be stored in access router 14.

To facilitate the separate accounting and billing techniques, access router 14 first determines CVLANs and SVLANs as identifiers for each of customers 24 of the service provider account registered to shared customer device 22A and each type of service and service provider requested by that customer during control plane configuration. Access router 14 is then able to separately track data usage for each of the customers of the same registered account based on CVLAN and SVLAN tags included in received data packets. In some examples, one or more of customers 24 may be connected to shared customer device 22A via a remote connection.

During the control plane configuration process, access router 14 receives a DHCP request for one of customers 24 from shared customer device 22A. By sending the DHCP request, shared customer device 22A is requesting access to core network 10 and configuration information, including an IP address, for the one of customers 24 from one of ISP network 12 in order to receive a type of service from the ISP network. In response to receiving the DHCP request, authentication unit 50 within access router 14 authenticates shared customer device 22A with RADIUS server 30 based on information included in the DHCP request.

Access router 14 also determines a CVLAN that identifies the one of customers 24 and a SVLAN that identifies the type of service and service provider requested in the DHCP request. As described above, access router 14 may assign a CVLAN to the customer from a pool of CVLANs designated by ISP networks 12 associated with the registered account of shared customer device 22A. Access router 14 may retrieve the CVLAN for the customer from the pool of CVLANs for shared customer device 22A from CVLAN database 64 stored in RADIUS server 30. In addition, access router 14 may select the SVLAN for the type of service and the service provider requested for the customer. Access router 14 may select the SVLAN from a pool of SVLANs for the requested service provider from SVLAN database 62 stored in RADIUS server 30. Access router 14 may then link the selected SVLAN to the type of service and service provider requested for the customer. In this way, the determined CVLAN and SVLAN are associated with the customer and used to identify the customer and the type of service and service provider requested by the customer.

After determining the CVLAN and SVLAN, accounting unit 52 within access router 14 generates a sub-account entry of the service provider account registered to shared customer device 22A that is linked to the CVLAN and SVLAN associated with the customer. In some cases, accounting unit 52 may generate the sub-account entry under the registered service provider account in accounting database 60 stored in RADIUS server 30. In other cases, accounting unit 52 may maintain an accounting database within access router 14. According to the techniques, accounting unit 50 may generate separate sub-account entries of the registered service provider account for each CVLAN and SVLAN pair in accounting database 60. More specifically, accounting unit 50 may generate an accounting entry for the service provider account registered to shared customer device 22A, and then generate separate sub-account entries under the registered service provider account linked to different CVLANs for each of unregistered customers 24 connected to shared customer device 22A. Accounting unit 50 may also generate additional sub-account entries linked to CVLAN and SVLAN pairs for each type of service used by each of customers 24.

Moreover, access router 14 generates a logical interface, i.e., one of IFLs 46, toward shared customer device 22A for the CVLAN and SVLAN associated with the customer of the service provider account registered to shared customer device 22A. The one of IFLs 46 generated for the CVLAN and SVLAN will be dedicated to carrying data traffic for the unregistered customer associated with the CVLAN and SVLAN between access router 14 and shared customer device 22A.

Access router 14 then adds CVLAN and SVLAN tags to the DHCP request and forwards the DHCP request toward the one of ISP networks 12 identified by the SVLAN tag, e.g., ISP network 12A. In accordance with the technique describes herein, access router 14 may embed the SVLAN tag in an option field of the DHCP request by adding an extra type-length-value (TLV) element to the DHCP protocol.

When the DHCP request reaches DHCP server 32A for the identified ISP network 12A, DHCP server 32A reads the SVLAN tag from the option field, and copies the SVLAN tag into an option field of a DHCP reply. Access router 14 receives the DHCP reply from the one of ISP networks 12 that includes the CVLAN and SVLAN tags associated with the requesting customer connected to shared customer device 22A, and simply forwards the DHCP reply toward shared customer device 22A.

Shared customer device 22A receives the DHCP reply and links the CVLAN and SVLAN associated with the requesting one of customers 24 to the IP address assigned to the one of customers 24. In the illustrated example, shared customer device 22A includes a SVLAN-CVLAN table 66 that may store the link between the CVLAN and SVLAN and the IP address for the one of customers 24. SVLAN-CVLAN table 66 may also store links between CVLANs and SVLANs and IP addresses for each of the unregistered customers 24 of the service provider account registered to shared customer device 22A. In some cases where the same customer requests two or more types of services from the same service provider, SVLAN-CVLAN table 66 may store multiple CVLAN and SVLAN pairs linked to the same IP address for the customer. In other cases where the same customer requests services from different service providers, SVLAN-CVLAN table 66 may store multiple CVLAN and SVLAN pairs linked to the multiple different IP addresses for the customer.

After the control plane is configured as described above, access router 14 may processes data packets received from customers 24 of the service provider account registered to shared customer devices 22 and/or network router 16, and perform accounting and billing separately for each of the unregistered customers 24. As an example of an upstream data packet flow, shared customer device 22A may receive a data packet from one of customers 24. The received data packet may be for a particular type of service requested by the customer, such as a voice packet for VoIP service or a data packet for Internet service. Shared customer device 22A looks up the correct CVLAN and SVLAN associated with the customer in SVLAN-CVLAN table 66 based on the source IP address of the data packet. Shared customer device 22A then adds the CVLAN and SVLAN tags associated with the customer to the data packet. Access router 14 receives the data packet from the customer on the one of IFLs 46 generated for the CVLAN and SVLAN. Accounting unit 52 within access router 14 then locates the sub-account entry of the registered service provider account of shared customer device 22A linked to the CVLAN and SVLAN for the customer in accounting database 60 stored in RADIUS server 30. Accounting unit 52 updates the upstream data usage in the sub-account entry for the customer based on the size of the received data packet. Access router 14 then forwards the data packet towards the one of ISP networks 12 identified by the SVLAN tag on one of IFCs 42 using L2 switching.

As an example of a downstream data packet flow, access router 14 may receive a data packet from network router 16, for example, that includes the CVLAN and SVLAN tags associated with one of customers 24 connected to shared customer device 22A. Accounting unit 42 within access router 14 then locates the sub-account entry of the registered service provider account of shared customer device 22 linked to the CVLAN and SVLAN for the customer in accounting database 60 stored in RADIUS server 30. Accounting unit 52 updates the downstream data usage in the sub-account entry for the customer based on the size of the received data packet. Access router 14 then forwards the data packet on the one of IFLs 46 generated for the CVLAN and SVLAN toward shared customer device 22A. Shared customer device 22A further forwards the data packet to the requesting one of customers 24 based on the destination IP address of the data packet.

In the case of either an upstream or downstream data packet, accounting unit 52 within access router 14 first updates the data usage in the sub-account entry of the service provider account registered to shared customer device 22 linked to the CVLAN and SVLAN for the customer based on the size of the received data packet. As described above, each customer may be associated with one or more SVLANs depending on the number of services the customer requests from ISP networks 12. In this way, access router 14 is able to separately track data usage for each type of service that the customer uses, and accurately determine data usage charges for the customer when each type of service is provided at a different price. Accounting unit 52 then calculates aggregate data usage for the customer based on one or more sub-account entries for the customer linked to different SVLANs that identify different types of service and service providers.

Accounting unit 52 next calculates the cost of the aggregate data usage for the customer. In some examples, the cost of data usage may be static across all service providers and types of services such that accounting unit 52 may simply multiply the cost per MB of data usage by the aggregate data usage for the customer. In other examples, the cost of data usage may be different for each service provider and each type of service identified by the different SVLANs. In this case, accounting unit 52 may separately calculate the cost of the data usage for each type of service, and then add the separate costs together to determine the cost of the aggregate data usage for the customer.

Accounting unit 52 may also calculate the total data usage for owner 23 of shared customer device 22A in the registered service provider account stored in accounting database 60 based on the aggregate data usage for all of customers 24 connected to shared customer device 22A. Accounting unit 52 then calculates the cost of the total data usage for owner 23 of shared customer device 22A. For example, accounting unit 52 may simply add together the cost of data usage for each of customers 24. In some cases, accounting unit 52 may calculate the aggregate data usage and the costs of the data usage each time accounting database 60 is updated based on a received data packet. In other cases, accounting unit 52 may only periodically calculate the aggregate data usage and the costs of the data usage. Access router 14 may then periodically, e.g., at the end of a billing cycle, report the data usage charges for each of customers 24 from accounting database 60 to the network operator.

In addition, shared customer device 22A may access its service provider accounts with the network operator to report the number of unregistered customers 24 connected to shared customer device 22A and to report customer linking information included in SVLAN-CVLAN table 66. For example, shared customer device 22A may report to the network operator that it has three unregistered customers 24. In addition, for a given customer 24A, shared customer device 22A reports the IP addresses assigned to customer 24A and the CVLAN and SVLAN tags linked to the IP addresses from SVLAN-CVLAN table 66. In this way, the network operator may determine which CVLAN and SVLAN tags are associated with which each of customers 24.

The network operator may use the data usage charges received from access router 14 and the customer linking information received from shared customer device 22A to generate a bill for owner 23 of shared network device 22A. Based on the separate data usage accounting performed by access router 14, the bill for the owner of shared customer device 22A may include separate data usage charges for each of customers 24 of the service provider account registered to owner 23 of shared customer device 22A. Owner 23 of shared customer device 22A may then, in turn, bill each of unregistered customers 24 for the actual amount of bandwidth or data used by that customer during the billing cycle. In this way, the techniques allow shared customer device 22A to operate as a virtual retail service provider and equitably share the cost of its registered service provider account with customers 24, which may reside in the same residential or business complex. In some examples, one or more of customers 24 may be connected to shared customer device 22A via a remote connection.

Figure 3:
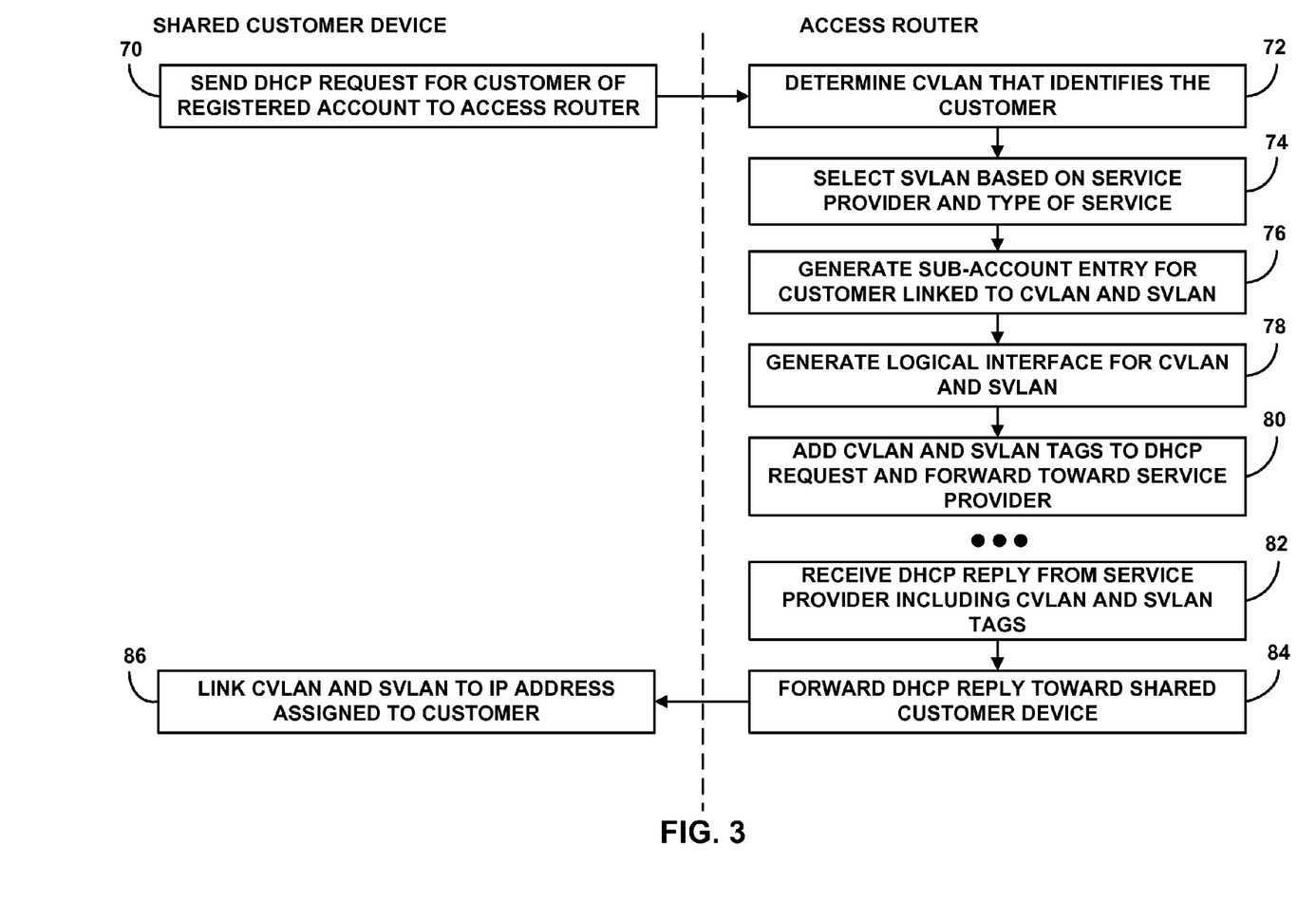
FIG. 3 is a flowchart illustrating an exemplary operation of control packet processing to enable an access router to perform the techniques of accounting and billing separately for each customer of a service provider account registered to an owner of a shared customer device.

FIG. 3 is a flowchart illustrating an exemplary operation of control packet processing to enable access router 14 to perform the techniques of accounting and billing separately for each customer of a service provider account registered to an owner of a shared customer device. The operation will be described with respect to access router 14, shared customer device 22A, and RADIUS server 30 from FIG. 2. In other examples, the operation may be described with respect to any of shared customer devices 22 from FIG. 1.

As described above, shared customer device 22A comprises a customer gateway router that is owned and operated by owner 23. In the illustrated embodiment of FIG. 1, unregistered customers 24 share the service provider account registered to owner 23 of shared customer device 22A. The techniques described in this disclosure enable shared customer device 22A to operate as a virtual retail service provider and share the cost of its registered service provider account with customers 24, which may reside in the same residential or business complex. In some examples, one or more of customers 24 may be connected to shared customer device 22A via a remote connection. In order to facilitate the separate accounting and billing techniques, access router 14 may be configured to generate separate identifiers for each of customers 24 and each type of service and service provider requested by that customer during control plane configuration.

In the illustrated example of FIG. 3, shared customer device 22A sends a DHCP request for one of customers 24, e.g., customer 24B, to access router 14 via access node 18 (70). In response to receiving the DHCP request, authentication unit 50 within access router 14 authenticates shared customer device 22A with RADIUS server 30 based on information included in the DHCP request. Access router 14 also determines a CVLAN that identifies customer 24B (72). As described above, access router 14 may retrieve the CVLAN for customer 24B from a pool of CVLANs associated with the registered account of shared customer device 22A from CVLAN database 64 stored in RADIUS server 30. In addition, access router 14 selects a SVLAN based on a service provider and type of service requested for customer 24B in the DHCP request (74). As described above, access router 14 may select the SVLAN for the type of service requested from SVLAN database 62 stored in RADIUS server 30 for the identified service provider, e.g., one of ISP networks 12.

Access router 14 then generates a sub-account entry of the service provider account registered to shared customer device 22A that is linked to the CVLAN and SVLAN associated with customer 24B (76). In some cases, access router 14 may generate the sub-account entry under the registered service provider account in accounting database 60 stored in RADIUS server 30. In other cases, access router 14 may maintain the accounting database. Access router 14 then generates a logical interface, e.g., one of IFLs 46, toward shared network device 22A for the CVLAN and SVLAN associated with customer 24B (78). Access router 14 then adds the CVLAN and SVLAN tags to the DHCP request and forwards the DHCP request toward the one of ISP networks 12 identified by the SVLAN tag, e.g., ISP network 12A (80).

Access router 14 may later receive a DHCP reply from ISP network 12A including the CVLAN and SVLAN tags associated with customer 24B (82). Access router 14 then forwards the DHCP reply toward shared customer device 22A (84). Shared customer device 22A receives the DHCP reply and links the CVLAN and SVLAN associated with customer 24B to the IP address assigned to customer 24B in SVLAN-CVLAN table 66 (86). By recording the relationship between the CVLAN and SVLAN and the IP address of customer 24B, shared customer device 22A may include the correct CVLAN and SVLAN tags in data packets generated by customer 24B to identify the customer to access router 14.

Figure 4:
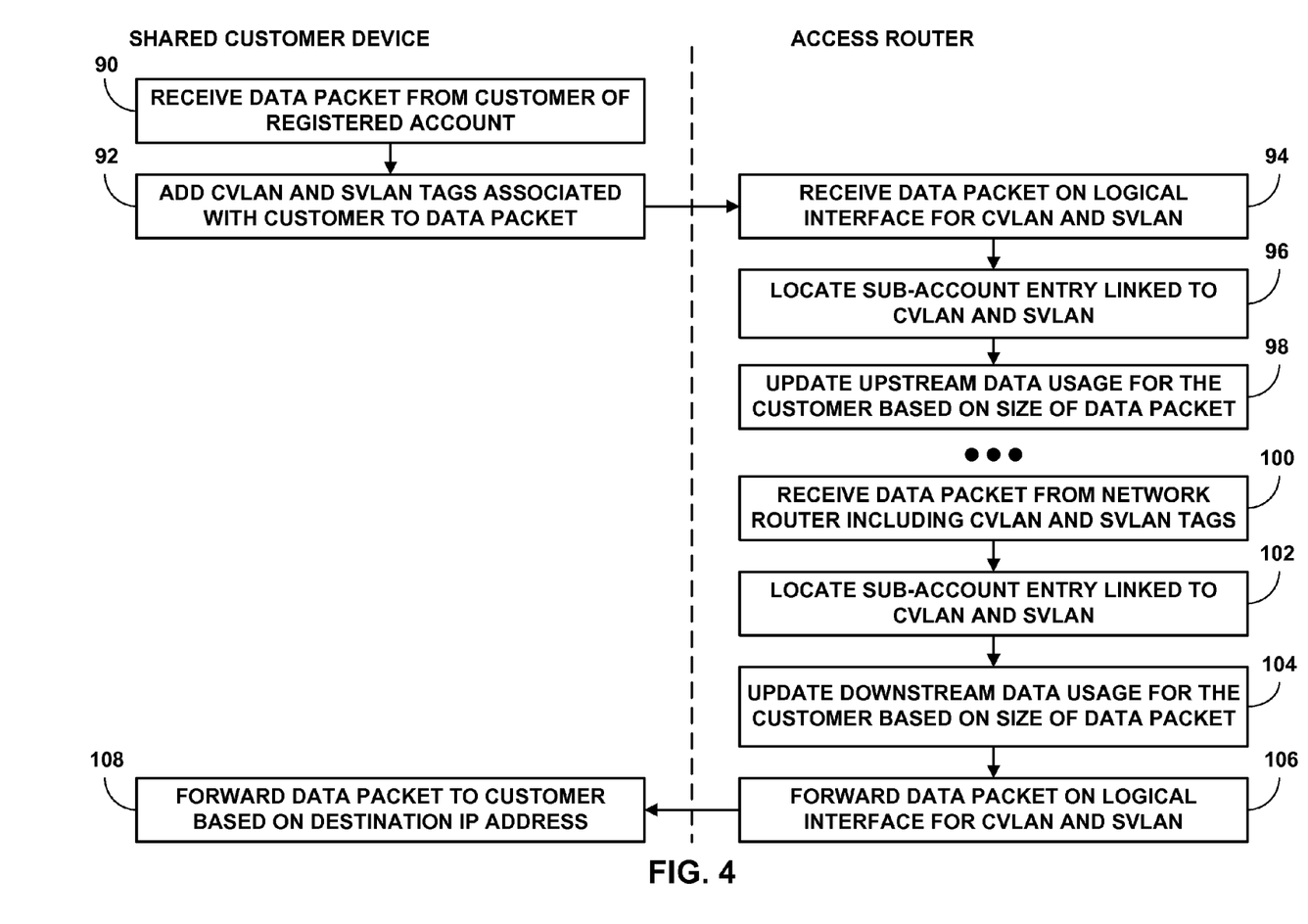
FIG. 4 is a flowchart illustrating an exemplary operation of data packet processing during which an access router performs accounting and billing separately for each customer of a service provider account registered to an owner of a shared customer device.

FIG. 4 is a flowchart illustrating an exemplary operation of data packet processing during which access router 14 performs accounting and billing separately for each customer of a service provider account registered to a shared customer device. The operation will be described with respect to access router 14, shared customer device 22A, and RADIUS server 30 from FIG. 2. In other examples, the operation may be described with respect to any of shared customer devices 22 from FIG. 1.

In the illustrated example of FIG. 4, shared customer device 22A receives a data packet from one of customers 24, e.g., customer 24B (90). Shared customer device 22A looks up the correct CVLAN and SVLAN associated with customer 24B in SVLAN-CVLAN table 66 based on the source IP address of the data packet. Shared customer device 22A then adds the CVLAN and SVLAN tags associated with customer 24B to the data packet (92).

Access router 14 receives the data packet on the one of IFLs 46 generated for the CVLAN and SVLAN (94). Access router 14 then locates the sub-account entry of the service provider account registered to shared customer device 22A linked to the CVLAN and SVLAN for customer 24B in accounting database 60 stored in RADIUS server 30 (96). Accounting unit 52 within access router 14 updates the upstream data usage in the sub-account entry for customer 24B based on the size of the received data packet (98). As described above, accounting unit 52 may first update the upstream data usage in the sub-account entry linked to the CVLAN and SVLAN, and then calculate aggregate data usage for customer 24B based on one or more sub-account entries for the customer linked to different SVLANs identifying different types of service and service providers.

Access router 14 may later receive a data packet from network router 16, for example, that includes the CVLAN and SVLAN tags associated with customer 24B (100). Access router 14 then locates the sub-account entry of the registered service provider account of shared customer device 22A linked to the CVLAN and SVLAN for customer 24B in accounting database 60 stored in RADIUS server 30 (102). Accounting unit 52 within access router 14 updates the downstream data usage in the sub-account entry for customer 24B based on the size of the received data packet (104). As described above, accounting unit 52 may first update the downstream data usage in the sub-account entry linked to the CVLAN and SVLAN, and then calculate aggregate data usage for customer 24B based on one or more sub-account entries for the customer linked to different SVLANs that identify different types of service and service providers.

Access router 14 forwards the data packet on the one of IFLs 46 generated for the CVLAN and SVLAN associated with customer 24B toward shared customer device 22A (106). Shared customer device 22A receives the data packet and forwards the data packet to customer 24B based on the destination IP address of the data packet (108).

Figure 5:
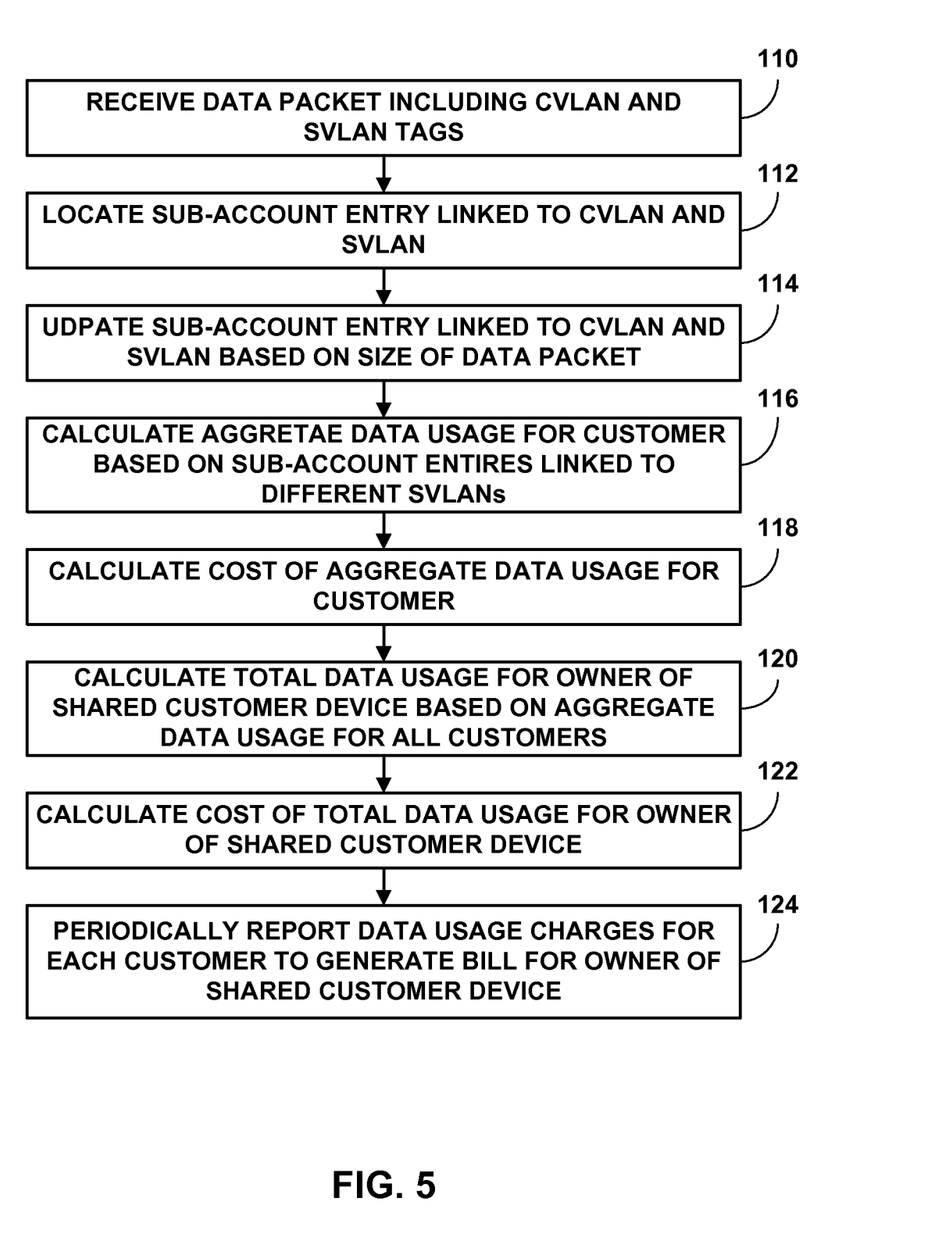
FIG. 5 is a flowchart illustrating an exemplary operation of performing accounting and billing separately for each customer in sub-accounts of a service provider account registered to an owner of a shared customer device.

FIG. 5 is a flowchart illustrating an exemplary operation of performing accounting and billing separately for each customer in sub-accounts of a service provider account registered to a shared customer device. The operation includes calculating aggregate data usage and cost for each customer of the same registered service provider account, and reporting the data usage charges to a network operator. The operation enables a network operator to generate a bill for the shared customer device that includes separate data usage charges for each customer of the service provider account registered to the shared customer device based on the data usage accounting performed by the access router. The operation will be described with respect to access router 14 from FIG. 2.

Access router 14 receives a data packet including CVLAN and SVLAN tags from one of shared customer devices 22, network router 16, or another network device on one of IFLs 46 (110). In response to receiving the data packet, access router 14 locates the sub-account entry of the service provider account registered to shared customer device 22A that is linked to the CVLAN and SVLAN for customer 24B in accounting database 60 stored in RADIUS server 30 (112).

Accounting unit 52 within access router 14 first updates the data usage in the sub-account entry of the registered service provider account linked to the CVLAN and SVLAN based on the size of the received data packet (114). Accounting unit 52 then calculates aggregate data usage for customer 24B based on one or more sub-account entries for the customer linked to different SVLANs identifying different types of service and service providers (116). Accounting unit 52 next calculates the cost of the aggregate data usage for customer 24B (118). In some examples, the cost of data usage may be static across all service providers and types of services such that accounting unit 52 may simply multiply the cost per MB of data usage by the aggregate data usage for customer 24B. In other examples, the cost of data usage may be different for each service provider and each type of service identified by the different SVLANs. In this case, accounting unit 52 may separately calculate the cost of the data usage for each type of service, and then add the separate costs together to determine the cost of the aggregate data usage for customer 24B.

Accounting unit 52 may also calculate the total data usage for owner 23 of shared customer device 22A in the registered service provider account in accounting database 60 based on the aggregate data usage for all of customers 24 connected to shared customer device 22A (120). Accounting unit 52 then calculates the cost of the total data usage for owner 23 of shared customer device 22A (122). For example, accounting unit 52 may simply add together the cost of data usage for each of customers 24. In some cases, accounting unit 52 may calculate the aggregate data usage and the costs of the data usage each time accounting database 60 is updated based on a received data packet. In other cases, accounting unit 52 may only periodically calculate the aggregate data usage and the costs of the data usage.

Access router 14 may then periodically, e.g., at the end of a billing cycle, report the data usage charges for each of customers 24 from accounting database 60 to the network operator to generate a bill for owner 23 of shared network device 22A (124). In addition, shared customer device 22A may access its service provider accounts with the network operator to report the number of unregistered customers 24 connected to shared customer device 22A and to report customer linking information included in SVLAN-CVLAN table 66. Based on the separate data usage accounting performed by access router 14 and the customer linking information from shared customer device 22A, the bill for the owner of shared customer device 22A may include separate data usage charges for each of customers 24 of the service provider account registered to owner 23 of shared customer device 22A. In this way, the techniques allow shared customer device 22A to operate as a virtual retail service provider and equitably share the cost of its registered service provider account with customers 24, which may reside in the same residential or business complex.

Various embodiments of the invention have been described. These and other embodiments are within the scope of the following claims.

The invention claimed is:

1. A method comprising:
   receiving data packets including tags identifying customer virtual local area networks (CVLANs) and service virtual local area networks (SVLANs) associated with a plurality of customers of a service provider account registered to a shared customer device; and
   performing data usage accounting separately for each of the plurality of customers in sub-accounts of the service provider account registered to the shared customer device based on the tags.

2. The method of claim 1, wherein performing data usage accounting separately for each of the plurality of customers comprises updating data usage in a sub-account for one of the plurality of customers upon receiving a data packet including a CVLAN tag and a SVLAN tag associated with the customer.

3. The method of claim 1, wherein performing data usage accounting separately for each of the plurality of customers comprises:
   updating a sub-account entry of the registered service provider account linked to a CVLAN and a SVLAN associated with one of the plurality of customers upon receiving a data packet including the CVLAN tag and the SVLAN tag; and calculating aggregate data usage for the customer based on one or more sub-account entries for the customer linked to different SVLANs.

4. The method of claim 3, further comprising calculating a cost of the aggregate data usage for the customer, wherein costs of data usage may be different for each service provider and each type of service identified by the different SVLANs.

5. The method of claim 1, further comprising periodically reporting the data usage for the plurality of customers of the service provider account registered to the shared network device to a network operator to generate a bill for an owner of the shared network device, wherein the bill includes separate data usage charges for each of the plurality of customers.

6. The method of claim 1, further comprising:
receiving a service request for one of the plurality of customers from the shared customer device;
determining a CVLAN that identifies the customer and a SVLAN that identifies a service provider and a type of service requested for the customer in the service request; and
generating a sub-account entry of the registered service provider account linked to the CVLAN and the SVLAN for the customer.

7. The method of claim 6, wherein determining a CVLAN and a SVLAN comprises determining the CVLAN and the SVLAN associated with the customer from an Authentication, Authorization, and Accounting (AAA) server based on information in the service request.

8. The method of claim 6,
wherein determining a CVLAN comprises selecting the CVLAN from a pool of CVLANs associated with the registered service provider account of the shared customer network; and
wherein determining a SVLAN comprises selecting the SVLAN from a pool of SVLANs for the service provider based on the type of service requested for the customer in the service request.

9. The method of claim 6, further comprising generating a logical interface toward the shared customer device for the CVLAN and the SVLAN associated with the customer, wherein the logical interface is configured to send and receive data packets including the CVLAN tag and the SVLAN tag.

10. The method of claim 6, further comprising receiving a service request reply including the CVLAN tag and the SVLAN tag associated with the customer from the service provider identified by the SVLAN tag, and forwards the service request reply toward the shared customer device.

11. The method of claim 6, further comprising adding the CVLAN tag and the SVLAN tag associated with the customer to the service request, and forwarding the service request toward the service provider identified by the SVLAN tag.

12. The method of claim 6, wherein the service request comprises a Dynamic Host Configuration Protocol (DHCP) request.

13. The method of claim 1, wherein at least one of the plurality of customers is remotely connected to the shared customer device.

14. An access router comprising:
a plurality of interfaces, wherein at least one of the plurality of interfaces is configured to receive data packets including tags identifying customer virtual local area networks (CVLANs) and service virtual local area network (SVLANs) associated with a plurality of customers of a service provider account registered to a shared customer device; and
a control unit configured to perform data usage accounting separately for each of the plurality of customers in sub-accounts of the service provider account registered to the shared network device based on the tags.

15. The access router of claim 14, wherein the control unit updates data usage in a sub-account for one of the plurality of customers upon receiving a data packet including a CVLAN tag and a SVLAN tag associated with the customer.

16. The access router of claim 14, wherein the control unit updates a sub-account entry of the registered service provider account linked to a CVLAN and a SVLAN associated with one of the plurality of customers upon receiving a data packet including the CVLAN tag and the SVLAN tag, and calculates aggregate data usage for the customer based on one or more sub-account entries for the customer linked to different SVLANs.

17. The access router of claim 16, wherein the control unit calculates a cost of the aggregate data usage for the customer, wherein costs of data usage may be different for each service provider and each type of service identified by the different SVLANs.

18. The access router of claim 14, further comprising periodically reporting the data usage for the plurality of customers connected to the shared network device to a network operator to generate a bill for an owner of the shared network device, wherein the bill includes separate data usage charges for each of the plurality of customers.

19. The access router of claim 14,
wherein at least one of the plurality of interfaces is configured to receive a service request for one of the plurality of customers from the shared customer device; and
wherein the control unit determines a CVLAN that identifies the customer and a SVLAN that identifies a service provider and a type of service requested for the customer in the service request, and generates a sub-account entry of the registered service provider account linked to the CVLAN and the SVLAN for the customer.

20. The access router of claim 19, wherein the control unit determines the CVLAN and the SVLAN associated with the customer from an Authentication, Authorization, and Accounting (AAA) server based on information in the service request.

21. The access router of claim 19, wherein the control unit selects the CVLAN from a pool of CVLANs associated with the registered service provider account of the shared customer network, and selects the SVLAN from a pool of SVLANs for the service provider based on the type of service requested for the customer in the service request.

22. The access router of claim 19, wherein the control unit generates a logical interface toward the shared customer device for the CVLAN and the SVLAN associated with the customer, and wherein the logical interface is configured to send and receive data packets including the CVLAN tag and the SVLAN tag.

23. The access router of claim 19, wherein the control unit receives a service request reply including the CVLAN tag and the SVLAN tag associated with the customer from the service provider identified by the SVLAN tag, and forwards the service request reply toward the shared customer device.

24. The access router of claim 19, wherein the control unit adds the CVLAN tag and the SVLAN tag associated with the customer to the service request, and forwards the service request toward the service provider identified by the SVLAN tag.

25. The access router of claim 19, wherein the service request comprises a Dynamic Host Configuration Protocol (DHCP) request.

26. The access router of claim 14, wherein at least one of the plurality of customers is remotely connected to the shared computer device.

27. A non-transitory computer-readable storage medium comprising instruction that cause one or more processors to:
receive data packets including tags identifying customer virtual local area network (CVLANs) and service virtual local area network (SVLANs) associated with a plurality of customers of a service provider account registered to a shared customer device; and
perform data usage accounting separately for each of the plurality of customers in sub-accounts of the service provider account registered to the shared network device based on the tags.

28. The computer-readable storage medium of claim 27, wherein the instructions cause the processors to:
update a sub-account entry linked to a CVLAN and a SVLAN associated with one of the plurality of customers upon receiving a data packet including the CVLAN tag and the SVLAN tag; and
calculate aggregate data usage for the customer based on one or more sub-account entries for the customer linked to different SVLANs.

29. The computer-readable storage medium of claim 27, further comprising instructions that cause the processor to:
receive a service request for one of the plurality of customers from the shared customer device;
determine a CVLAN that identifies the customer and a SVLAN that identifies a service provider and a type of service requested for the customer in the service request; and
generate a sub-account entry for the customer linked to the CVLAN and the SVLAN.

30. A system comprising:
a shared customer device that maintains at least one registered service provider account shared by a plurality of customers connected to the shared customer device, wherein the shared customer device is configured to add tags identifying customer virtual local area networks (CVLANs) and service virtual local area networks (SVLANs) to data packets generated by the plurality of customers; and
an access router configured to perform data usage accounting separately for each of the plurality of customers in sub-accounts of the service provider account registered to the shared customer device based on the CVLAN tags and the SVLAN tags included in received data packets.

31. The system of claim 30, further comprising a service provider server, wherein the shared customer device:
sends a service request for one of the plurality of customers to the service provider server via the access router; and
receives a service request reply for the customer from the service provider server, wherein the service request reply includes tags identifying a CVLAN that identifies the customer and a SVLAN that identifies the service provider server and a type of service requested for the customer in the service request.

32. The system of claim 31,
wherein the access router includes the CVLAN tag and the SVLAN tag in the service request for the customer, and forwards the service request toward the service provider server identified by the SVLAN tag; and
wherein the service provider server copies the CVLAN tag and the SVLAN tag into the service request reply for the customer, and forwards the service request reply toward the shared customer device.

33. The system of claim 31, wherein the shared customer device links the CVLAN and the SVLAN associated with the customer to an Internet Protocol (IP) address assigned to the customer.

34. The system of claim 31, further comprising an Authentication, Authorization, and Accounting (AAA) server, wherein the access router determines the CVLAN and the SVLAN associated with the customer from the AAA server based on information in the service request received from the shared customer device, and generates a sub-account entry of the registered service provider account in the AAA server linked to the CVLAN and the SVLAN for the customer.

35. The system of claim 31, wherein the service request comprises a Dynamic Host Configuration Protocol (DHCP) request.

36. The system of claim 30, wherein the access router:
updates a sub-account entry of the registered service provider account linked to a CVLAN and a SVLAN associated with one of the plurality of customers upon receiving a data packet including the CVLAN tag and the SVLAN tag; and
calculates aggregate data usage for the customer based on one or more sub-account entries for the customer linked to different SVLANs.

37. The system of claim 30, wherein the access router periodically reports the data usage for the plurality of customers connected to the shared network device to a network operator to generate a bill for an owner of the shared network device, wherein the bill includes separate data usage charges for each of the plurality of customers.

38. The system of claim 30, wherein at least one of the plurality of customers is remotely connected to the shared computer device.

39. A method comprising:
maintaining at least one service provider account registered to a shared customer device, wherein the registered service provider account is shared by a plurality of customers connected to the shared customer device;
adding, with the shared customer device, tags identifying customer virtual local area networks (CVLANs) and service virtual local area networks (SVLANs) to data packets generated by the plurality of customers; and
performing, with an access router, data usage accounting separately for each of the plurality of customers in sub-accounts of the service provider account registered to the shared customer device based on the CVLAN tags and the SVLAN tags included in received data packets.

40. The method of claim 39, further comprising:
sending, with the shared customer device, a service request for one of the plurality of customers to a service provider server via the access router; and
receiving, with the shared customer device, a service request reply for the customer from the service provider server, wherein the service request reply includes tags identifying a CVLAN that identifies the customer and a SVLAN that identifies the service provider server and a type of service requested for the customer in the service request.

41. The method of claim 40 further comprising:
at the access router, including the CVLAN tag and the SVLAN tag in the service request for the customer, and forwarding the service request toward the service provider server identified by the SVLAN tag; and
at the service provider server, copying the CVLAN tag and the SVLAN tag into the service request reply for the customer, and forwarding the service request reply toward the shared customer device.

42. The method of claim 40, further comprising, at the shared customer device, linking the CVLAN and the SVLAN associated with the customer to an Internet Protocol (IP) address assigned to the customer.

43. The method of claim 40, further comprising:
determining, with the access router, the CVLAN and the SVLAN associated with the customer from an Authentication, Authorization, and Accounting (AAA) server based on information in the service request received from the shared customer device; and
generating, with the access router, a sub-account entry in the AAA server linked to the CVLAN and the SVLAN for the customer.

44. The method of claim 39, wherein performing, with the access router, data usage accounting separately for each of the plurality of customers comprises:
updating a sub-account entry linked to a CVLAN and a SVLAN associated with one of the plurality of customers upon receiving a data packet including the CVLAN tag and the SVLAN tag; and
calculating aggregate data usage for the customer based on one or more sub-account entries for the customer linked to different SVLANs.

45. The method of claim 39, further comprising periodically reporting, with the access router, the data usage for the plurality of customers connected to the shared network device to a network operator to generate a bill for an owner of the shared network device, wherein the bill includes separate data usage charges for each of the plurality of customers.

46. A non-transitory computer-readable storage medium comprising instruction that cause one or more processors to:
maintain at least one service provider account registered to a shared customer device, wherein the shared customer device is shared by a plurality of customers connected to the shared customer device;
add tags identifying customer virtual local area networks (CVLANs) and service virtual local area networks (SVLANs) to data packets generated by the plurality of customers at the shared customer device; and
perform data usage accounting separately for each of the plurality of customers in sub-accounts of the service provider account registered to the shared customer device based on the CVLAN tags and the SVLAN tags included in received data packets at an access router.

47. The computer-readable storage medium of claim 46, further comprising instructions that cause the processors to:
send a service request for one of the plurality of customers from the shared customer device to a service provider server via the access router; and
receive a service request reply for the customer at the shared customer device from the service provider server, wherein the service request reply includes tags identifying a CVLAN that identifies the customer and a SVLAN that identifies the service provider server and a type of service requested for the customer in the service request.

48. The computer-readable storage medium of claim 47, further comprising instructions that cause the processors to:
include the CVLAN tag and the SVLAN tag in the service request for the customer at the access router, and forward the service request from the access router toward the service provider server identified by the SVLAN tag; and
copy the CVLAN tag and the SVLAN tag into the service request reply for the customer at the service provider server, and forward the service request reply toward the shared customer device.

49. The computer-readable storage medium of claim 47, further comprising instructions that cause the processors to:
determine the CVLAN and the SVLAN associated with the customer from an Authentication, Authorization, and Accounting (AAA) server based on information in the service request received at the access router from the shared customer device; and
generate a sub-account entry of the registered service provider account in the AAA server linked to the CVLAN and the SVLAN for the customer.

50. The computer-readable storage medium of claim 46, wherein the instructions cause the processor to:
update a sub-account entry of the registered service provider account linked to a CVLAN and a SVLAN associated with one of the plurality of customers upon receiving a data packet including the CVLAN tag and the SVLAN tag at the access router; and
calculate aggregate data usage for the customer based on one or more sub-account entries for the customer linked to different SVLANs.

\* \* \* \* \*